United States Patent
Moon et al.

(10) Patent No.: US 8,699,799 B2
(45) Date of Patent: Apr. 15, 2014

(54) FINGERPRINT VERIFICATION METHOD AND APPARATUS WITH HIGH SECURITY

(75) Inventors: Dae-Sung Moon, Daejeon (KR); Ki-Young Moon, Daejeon (KR); Jang-Hee Yoo, Daejeon (KR); Yun-Su Chung, Daejeon (KR); Woo-Yong Choi, Daejeon (KR); So-Hee Park, Daejeon (KR); Byung-Jun Kang, Seoul (KR); Yong-Jin Lee, Ansan-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 875 days.

(21) Appl. No.: 12/881,545

(22) Filed: Sep. 14, 2010

(65) Prior Publication Data
US 2011/0123072 A1 May 26, 2011

(30) Foreign Application Priority Data

Nov. 24, 2009 (KR) .................. 10-2009-0113861

(51) Int. Cl.
*G06K 9/48* (2006.01)
(52) U.S. Cl.
USPC ........................................................ 382/199
(58) Field of Classification Search
USPC .......... 300/383, 384; 396/15; 902/3; 283/68, 283/69; 340/5.52, 5.53, 5.81, 5.82, 5.83, 340/5.84
See application file for complete search history.

(56) References Cited

U.S. PATENT DOCUMENTS

| | | | | |
|---|---|---|---|---|
| 6,219,794 B1* | 4/2001 | Soutar et al. | | 726/18 |
| 2008/0065900 A1 | 3/2008 | Lee et al. | | |
| 2009/0046904 A1* | 2/2009 | Moon et al. | | 382/124 |
| 2009/0080778 A1* | 3/2009 | Lee et al. | | 382/195 |

FOREIGN PATENT DOCUMENTS

| | | |
|---|---|---|
| KR | 10-20714303 | 4/2007 |
| KR | 10-2008-0022729 | 3/2008 |

OTHER PUBLICATIONS

Nandakumar et al, "Fingerprint-based Fuzzy Vault: Implementation and Performance", IEEE Transactions on Information Forensics and Security, Dec. 2007.*
Umut Uludag et al., "Fuzzy Vault for Fingerprints," Audio-and Video-based Biometric Person Authentication, Jul. 2005, U.S.A.
Karthik Nandakumar et al., "Fingerprint-based Fuzzy Vault: Implementation and Performance," IEEE Transactions on Information Forensics and Security, Dec. 2007, U.S.A.

* cited by examiner

*Primary Examiner* — Chan Park
*Assistant Examiner* — Elisa Rice
(74) *Attorney, Agent, or Firm* — Staas & Halsey LLP (57) ABSTRACT

A fingerprint verification apparatus that adds chaff fingerprint information to real fingerprint information of a user and then, hides and stores the fingerprint information of the user with a polynomial generated by unique information of the individual, thereby safely protecting the important fingerprint information of the user stored in a storing unit from an external attacker and safely managing an private key using the fingerprint information when using the private key as the unique information for making the polynomial.

17 Claims, 10 Drawing Sheets

FINGERPRINT VERIFICATION METHOD AND APPARATUS WITH HIGH SECURITY

CROSS REFERENCE TO RELATED APPLICATIONS

This application claims priority to Korean Patent Application No. 10-2009-0113861 filed on Nov. 24, 2009, the entire contents of which are herein incorporated by reference.

BACKGROUND OF THE INVENTION

1. Field of the Invention

The present invention relates to a fingerprint verification method and apparatus safely storing fingerprint information and then performing verification. More specifically, the present invention relates to a fingerprint verification method and apparatus hiding minutiae and safely storing the fingerprint information in order to prevent the reuse of the fingerprint information when the important fingerprint information of the individual stored in a storing unit is leaked to the unauthorized users.

2. Description of the Related Art

Since the biometric data of the individual have finite information such as one face, two irises, etc., they cannot be freely changed unlike a password or a personal identification number (PIN) used to approach an information system. Since the fingerprint information also has 10 fingers, when the registration fingerprint information is leaked, a serious problem that the fingerprint information is changed only ten times may occur. Therefore, even though a living body, in particular, the fingerprint information stored in the storing unit is leaked, there is a need to prevent an attacker from reusing the leaked fingerprint information.

The simplest method for safely storing the finger information generally uses a cryptograph scheme. However, a method for using a cryptograph scheme has an additional problem safely and effectively managing a private key. In particular, since the a method for using a cryptograph scheme has a problem in repeatedly performing decoding operation during a comparison process for user verification and performing encryption operation when encrypting and storing the fingerprint information registered in the fingerprint verification system, it cannot be used in the fingerprint verification system that searches the users in a large capacity of database.

In order to solve the problem when using the encryption scheme for safely storing the fingerprint information, the fingerprint comparison should be performed in a transformed space in which the fingerprint information is transformed and stored by non-invertible transform. However, non-linear transform is required to perform the non-invertible transform. When the non-linear transform is performed, the geometrical information of the fingerprint information is lost, such that the general fingerprint comparing method according to the related art cannot perform the comparison in the transformed space.

As an alternative of the non-invertible transform, there is a method that adds chaff fingerprint features optionally generated when registering the fingerprint features (real fingerprint features) of the user and registers them together. Since the registration fingerprint features are stored without explicitly indicating the real and chaff fingerprint features, the attacker cannot separate and reuse only the real minutiae when the registration fingerprint features are leaked to the attacker. However, since the person in question cannot identify what the real minutiae is, there is a problem in that he and/she cannot identify the real minutiae even when he and/she attempts just verification.

In order to solve the problem, any polynomial is generally generated and the real minutiae is configured to include values obtained by substituting into the generated polynomial and the chaff minutiae is configured to include values that do not exist in the generated polynomial. When the verification is requested, the same minutiae that coincides with each other by comparing the registration fingerprint features consisting of the real and chaff fingerprint features and the verified finger features can be obtained. At this time, when requesting the verification using the registration fingerprint of the user, most of the same minutiae are more likely to become the real minutiae. The same minutiae can confirm the person in question by generating the same polynomial as one used in the registration process by using simultaneous equations.

As described above, there are two problems in a method of protecting the real minutiae by adding the chaff minutiae.

First, the strength of safely protecting the real minutiae is proportional to the number of the added chaff minutiae. In other words, as the chaff minutiae is more added, the attacker cannot identify the real minutiae. However, the maximum number of addable chaff minutiae is determined depending on the size of the fingerprint image, such that the sufficient safety cannot be secured.

Second, in order to generate the same polynomial as one used in the registration process, a larger number of minutiae than the degree of the polynomial should be input to simultaneous equations. If the number of real minutiae of the registration fingerprint is smaller than the degree of the polynomial, there occurs a serious problem in that it is impossible to recover the polynomial even though all the real minutiae coincide with each other when performing the verification. When lowering the degree of the polynomial in order to solve the problem, the attacker can attempt the direct polynomial recovery instead of separating the real and chaff fingerprint features from the registration fingerprint features, such that there occur a problem in that the safety of the fingerprint verification system cannot be secured.

Korean Patent Registration No. 0714303 discloses an automatic fingerprint alignment of a finger fuzzy vault system and solves the problem by previously aligning minutiae using a geometric hashing scheme in a process of registering fingerprints and performing the matching with the previously aligned minutiae in the verification process, since the alignment problem of the fingerprint minutiae due to the similarity calculation of the template in which the minutiae of the user to be verified, the real minutiae, and the chaff minutiae are mixed occurs in a fingerprint fuzzy vault. However, there are problems in that the Korean Patent Registration No. 0714303 limits the number of addable chaff minutiae and uses one polynomial having a fixed degree, depending on the size of the fingerprint image such that it cannot secure the safety of the fingerprint verification system.

""Fuzzy Vault for Fingerprints", Audio- and Video-based Biometric Person Authentication, Vol. 5, pp. 310-319, 2005.7" published by U. Uludag et al. discloses a scheme that measures the fingerprint verification performance by applying the fuzzy vault to the fingerprint and fixes the number of polynomials into one and then applies the fuzzy vault to the fingerprint. However, the scheme disclosed in the article limits the number of addable chaff minutiae and uses one polynomial having a fixed degree, depending on the size of the fingerprint image, such that it cannot secure the safety of the fingerprint verification system.

""Fingerprint-based Fuzzy Vault Implementation and Performance", IEEE Trans Information Forensics and Security, Vol 2, No 4, pp 744-757, 2007.12" published by K Nandakumar, et al. uses extracted data, that is, Helper Data for fingerprint alignment separately from a fingerprint feature extracting process in order to solve the fingerprint alignment problem of the finger fuzzy vault and discloses a scheme depending on total inspection using CRC decoding in order to recover the polynomial. However, the scheme disclosed in the article limits the number of addable chaff minutiae and uses one polynomial having a fixed degree, depending on the size of the fingerprint image, such that it cannot secure the safety of the fingerprint verification system.

SUMMARY OF THE INVENTION

The present invention proposes to solve the above problems. It is an object of the present invention to provide a fingerprint verification method and apparatus with high security that adds chaff fingerprint information to real fingerprint information of a user and then, hides and stores the fingerprint information of the user with a polynomial generated by unique information of the individual, thereby safely protecting the important fingerprint information of the user stored in a storing unit from an external attacker and safely managing an private key using the fingerprint information when using the private key as the unique information for making the polynomial.

It is another object of the present invention to provide a fingerprint verification method and apparatus with high security that generates a virtual fingerprint image larger than a size of a fingerprint image in order to increase the maximum insertion number of chaff minutiae that is determined based on the size of the fingerprint image and generates more chaff minutiae through the virtual fingerprint image and stores them together with a real image, thereby making it possible to safely protect the important fingerprint information of the user stored in a storing unit from an external attacker.

Further, it is an object of the present invention to provide a fingerprint verification method and apparatus with high security that can improve accuracy of fingerprint verification by differentially determining a degree of polynomial according to the number of real minutiae since the verification of the person in question fails due to the non-recovered polynomial even though minutiae coincides completely when the number of real minutiae extracted from the registration fingerprint of the user is smaller than a degree of a polynomial and can secure the crypto-complexity of an entire system by using two or more polynomials and improve the accuracy of the fingerprint verification since an attacker can directly attempt the polynomial recovery when the too small degree of a polynomial is used, in differentially determining the degree of the polynomial.

According to an exemplary embodiment of the present invention, there is provided a fingerprint verification apparatus, including; a registration fingerprint minutiae extracting unit that extracts real minutiae for a registration fingerprint image subjected to a preprocessing process; a minutiae protecting unit that transforms the extracted real minutiae by a polynomial based on unique information, generates a predetermined chaff minutiae in order to hide the extracted real minutiae and generates the chaff minutiae using a value different from a polynomial result value of the real minutiae, and generates registration minutiae information using the transformed real minutiae and the chaff minutiae and stores the generated registration minutiae information in the store unit; a verification fingerprint minutiae extracting unit that extracts the minutiae from the input verification fingerprint image; and a fingerprint comparing unit that determines whether the minutiae information extracted from the verification fingerprint minutiae extracting unit coincides with the registration minutiae information stored in the storing unit by measuring the similarity therebetween.

The minutiae protecting unit includes a unique information generating unit that generates the unique information for generating a polynomial to be used to protect the minutiae, a polynomial generating unit that generates the generated unique information as the polynomial corresponding to a predetermined degree, a polynomial projecting unit that adds results obtained by substituting coordinate information among a first material structure that is real minutiae extracted from the registration fingerprint minutiae extracting unit into the polynomial to the first material structure and stores it as a third material structure, a chaff minutiae generating unit that generates an optional chaff minutiae as a second material structure, and a registration feature generating unit that optionally mixes the third material structure with the second material structure and registers it in the storing unit.

The first materials structure is represented by a type of (x, y, θ, type) (where x and y are coordinates of minutiae, θ is an angle of minutiae, and a type is a type of minutiae), the third material structure is represented by a type of (x, y, θ, type, f(x), or f(y))(where f(x) is a result obtained by substituting the information of the x coordinate among the minutiae into the polynomial and f(y) is a result obtained by substituting the information of the x coordinate into the polynomial), and the second material structure is represented by a type of (x', y', θ', type', β), x' or y' β≠f(x') or β≠f(y') being not a root of the polynomial f(x) or f(y).

The degree of the polynomial generated from the polynomial generating unit is determined as a smaller degree than the number of minutiae extracted from the registration fingerprint minutiae extracting unit.

The chaff minutiae generating unit generates the chaff minutiae beyond the defined tolerance with respect to the x and y coordinate values and the direction of the real minutiae.

The minutiae protecting unit further includes a virtual image generating unit that generates a virtual fingerprint image, wherein the chaff minutiae generating unit uses the virtual fingerprint image to add a larger chaff minutiae than the defined number in the fingerprint image.

The fingerprint comparing unit separates the real minutiae from the registration minutiae in which the real minutiae and the chaff minutiae are mixed, uses the separated real minutiae to recover the same polynomial as one generated from the polynomial generating unit, and performs the verification by recovering the unique information from the recovered polynomial.

The fingerprint comparing unit includes a fingerprint alignment unit that performs an alignment process translating and rotating the verification fingerprint minutiae extracted from the verification fingerprint minutiae extracting unit and the registration minutiae stored in the storing unit as much as the changed amount; a coinciding pair of minutiae selecting unit that selects the coinciding pair of minutiae from the aligned registration minutiae and the verification fingerprint minutiae; an error correcting unit that performs an error correcting process excluding the chaff minutiae from the coinciding pair of minutiae; a polynomial recovering unit that receives the pair of minutiae subjected to the error correcting process and recovers the polynomial; a unique information recovering unit that obtains the unique information using the coefficient or root of the recovered polynomial; and a user verifying unit that verifies as the person in question when the obtained unique information is the same as the unique information generated from the unique information generating unit.

There is provided a fingerprint verification method, includes: forming a first material structure that extracts real minutiae from a registration fingerprint image of input user; generating a predetermined chaff minutiae for hiding the real minutiae; generating unique information; generating a polynomial based on the generated unique information; forming a predetermined third material structure by substituting the first material structure into the polynomial; forming a predetermined second material structure by generating a value different from a polynomial result value of the real minutiae with respect to the chaff minutiae; and generating registration minutiae information using the third material structure and the second material structure and registers the generated registered minutiae information.

The fingerprint verification method further includes: extracting the verification fingerprint minutiae from the verification fingerprint image of the input user; selecting a coinciding pair of minutiae by comparing the registered minutiae information and the verification fingerprint minutiae information; recovering a polynomial from the selected pair of minutiae; recovering unique information from the recovered polynomial; and verifying as the person in question when the recovered unique information is the same as the unique information generated from the unique information generating unit.

The first materials structure is represented by a type of (x, y, θ, type) (where x and y are coordinates of minutiae, θ is an angle of minutiae, and a type is a type of minutiae), the third material structure is represented by a type of (x, y, θ, type, f(x), or f(y))(where f(x) is a result obtained by substituting the information of the x coordinate among the minutiae into the polynomial and f(y) is a result obtained by substituting the information of the x coordinate into the polynomial), and the second material structure is represented by a type of (x', y', θ', type', β), x' or y' β≠f(x') or β≠f(y') being not a root of the polynomial f(x) or f(y).

The degree of the generated polynomial is determined as a smaller degree than the number of the extracted registration fingerprint minutiae.

The generating the chaff minutiae generates the chaff minutiae beyond the defined tolerance with respect to the x and y coordinate values and direction of the real minutiae.

The fingerprint verification method further includes generating a virtual fingerprint image, wherein the generating the chaff minutiae uses the virtual fingerprint image to add a larger chaff minutiae than the defined number in the fingerprint image.

The adding the chaff minutiae determines the number of chaff minutiae to be added, determines the length and breadth of the virtual fingerprint image to which the chaff minutiae of the determined number is added, selects a translation coordinate for translating the real fingerprint image to an optional position on the virtual fingerprint image, and assumes the selected translation coordinate as an original point of the real fingerprint image and translates the real minutiae to the virtual fingerprint image.

The fingerprint verification method further includes: prior to the selecting the pair of minutiae, translating and rotating the registered minutiae information and the verification fingerprint minutiae information as much as the changed amount and aligning the registered minutiae information and the verification fingerprint minutiae information.

The fingerprint verification method further includes after selecting the pair of minutiae, performing an error correcting process excluding the chaff minutiae from the coinciding pair of minutiae.

According to the present invention, it can add the information of the real minutiae of the user to the information of the chaff minutiae to safely protect the important fingerprint information of the user stored in the storing unit from the external attacker and cannot reuse the information of the fingerprint minutiae since the attacker cannot identify the real minutiae even when the stored information of the fingerprint minutiae is leaked to the outside.

In other words, 1) the present invention can more improve the security than the existing method by generating the virtual fingerprint image and then, adding more chaff minutiae. Further, 2) the present invention can solve the problem of security that is generated when comparing the fingerprint features including the real and chaff minutiae registered twice. In addition, since the fingerprint minutiae are distributed around the middle area of the fingerprint image, there is a problem that the minutiae existing at the edge portion of the fingerprint image can be assumed to be the chaff minutiae when the chaff minutiae are added. However, according to the present invention, 3) since the fingerprint image translates to any positions of the virtual fingerprint image, the minutiae existing at the edge of the virtual fingerprint image cannot be considered as the chaff minutiae, thereby making it possible to improve the security.

DETAILED DESCRIPTION OF THE PREFERRED EMBODIMENTS

The present invention will be described below with reference to the accompanying drawings. Herein, the detailed description of a related known function or configuration that may make the purpose of the present invention unnecessarily ambiguous in describing the present invention will be omitted Exemplary embodiments of the present invention are provided so that those skilled in the art may more completely understand the present invention. Accordingly, the shape, the size, etc., of elements in the figures may be exaggerated for explicit comprehension.

Hereinafter, exemplary embodiments of the present invention will be described in detail with reference to the accompanying drawings.

Figure 6:
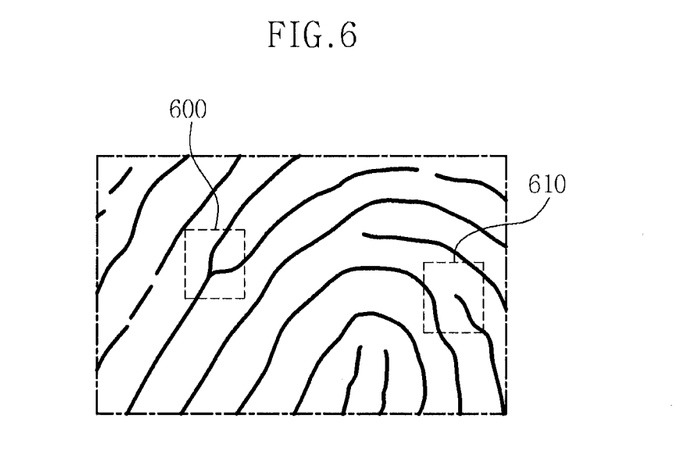
FIG. 6 is an exemplary diagram for explaining fingerprint feature information used in a general fingerprint verification system.

Generally, fingerprint feature information used in a fingerprint verification system uses an ending point 610 at which a ridge ends and a bifurcation point 600 at which one ridge is divided into two, in a fingerprint image shown in FIG. 6. The extracted one minutiae has a coordinates (x and y) of minutiae, an angle (θ) of the minutiae, and a type information of the minutiae and is represented by (x, y, θ, type). In addition, the fingerprint feature is called a minutiae in the fingerprint verification system.

Figure 1:
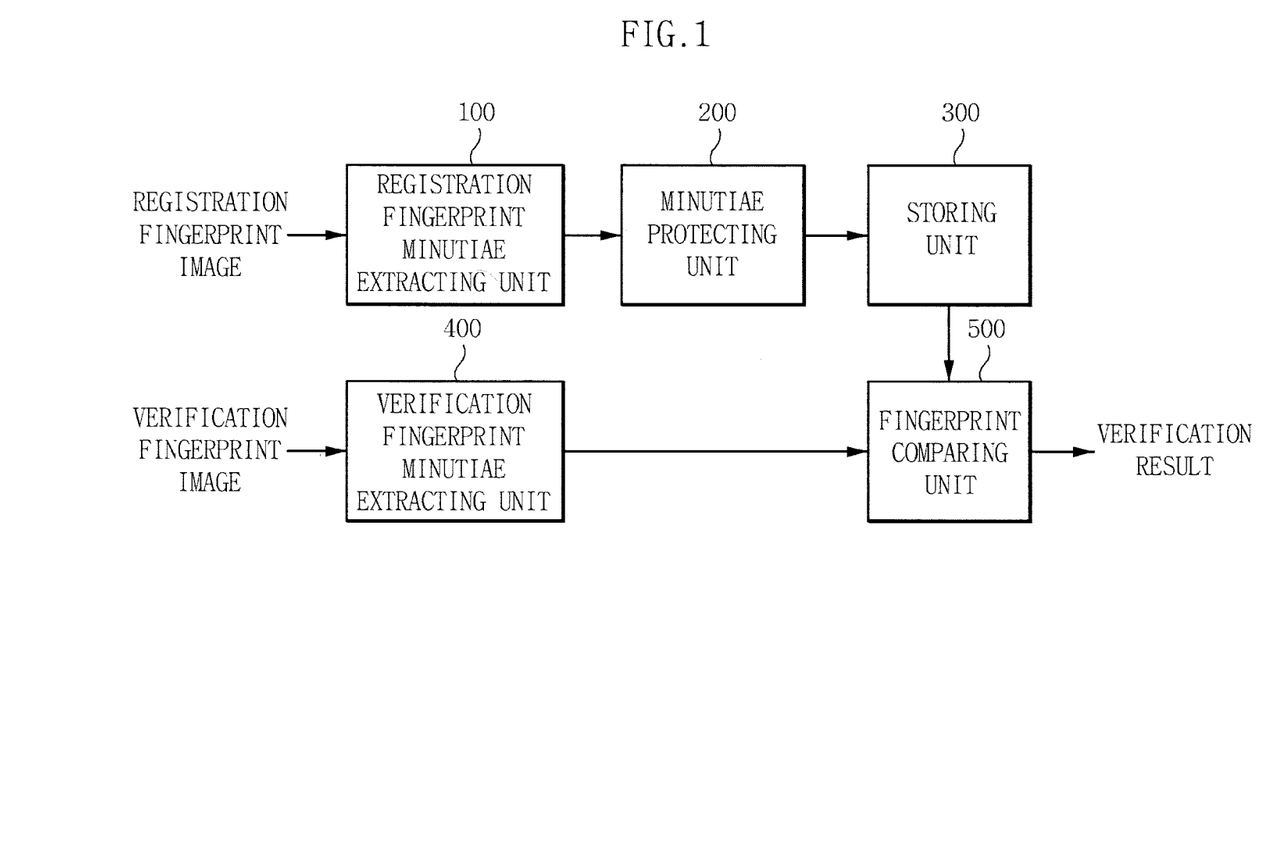
FIG. 1 is a configuration block diagram of a fingerprint verification apparatus with high security according to the present invention.

FIG. 1 is a block configuration block diagram of a fingerprint verification apparatus with high security according to the present invention.

As shown in FIG. 1, the fingerprint verification apparatus according to the present invention includes a registration fingerprint minutiae extracting unit 100, a minutiae protecting unit 200, a storing unit 300, a verified fingerprint minutiae extracting unit 400, and a fingerprint comparing unit 500.

The registration fingerprint minutiae extracting unit 100 extracts minutiae from the registration fingerprint of the user that is subjected to a preprocessing process. When the minutiae of the extracted registration fingerprint image is stored in a database of a storing unit 300 as it is, there is a problem in that it is leaked by a malicious attacker and can be reused. In order to solve the above problem, in the present invention, even though the minutiae of the registration fingerprint image is leaked, the minutiae protecting unit 200 performs a transform process protecting the minutiae not to be able to be reused, which is then stored in the database of the storing unit 300.

In the fingerprint verification process, the verification fingerprint minutiae extracting unit 400 extracts minutiae from the verification fingerprint image that is subjected to the same preprocessing as the registration process. The fingerprint comparing unit 500 measures the similarity between the minutiae extracted from the verification fingerprint minutiae extracting unit 400 and the registration fingerprint minutiae pre-stored in the database of the storing unit 300 in the fingerprint registration process to determine whether they coincide with each other.

The minutiae protecting unit 200 uses non-invertible transform to transform the minutiae of the registration fingerprint and the feature information transformed in the minutiae protecting unit 200 is used in the fingerprint comparing unit 500 instead of the minutiae extracted from the registration fingerprint minutiae extracting unit 100.

Figure 2:
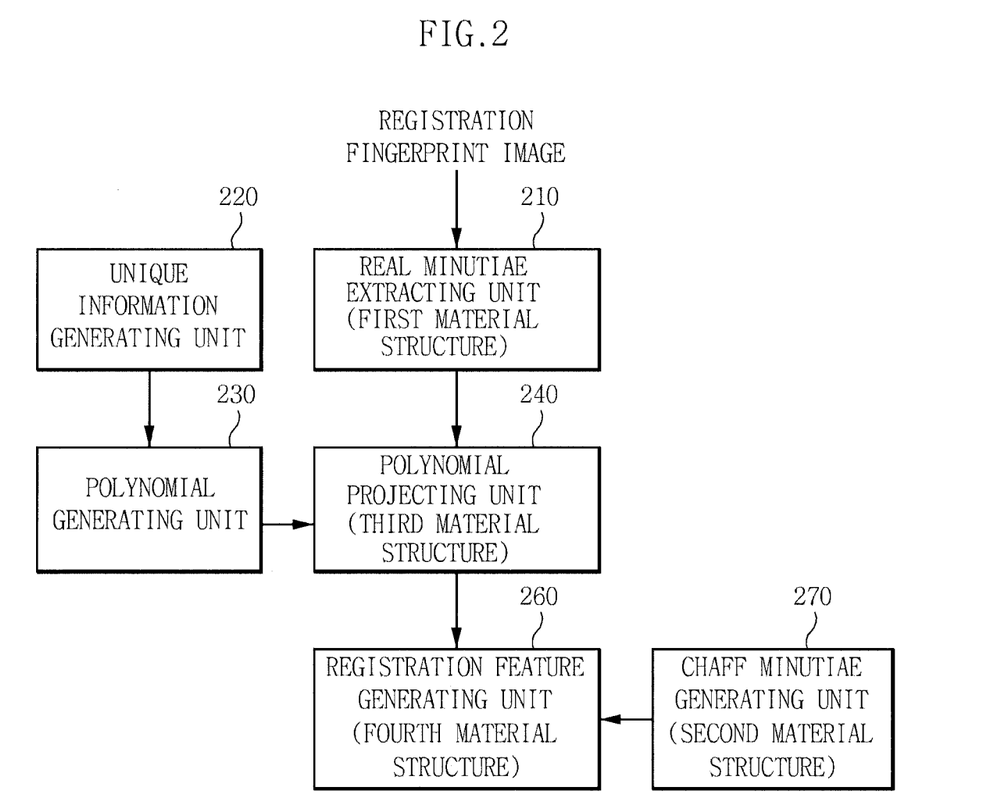
FIG. 2 is a detailed block configuration diagram of a minutiae protecting unit of FIG. 1.

FIG. 2 is a detailed block configuration diagram of the minutiae protecting unit 200 of FIG. 1.

As shown in FIG. 2, the minutiae protecting unit 200 includes a unique information generating unit 220, a polynomial generating unit 230, a polynomial projecting unit 240, a registration feature generating unit 260, and a chaff minutiae generating point 270.

The real minutiae extracting unit 210 is the same as the registration fingerprint minutiae extracting unit of FIG. 1 and extracts the real minutiae from the registration fingerprint image, which is called a first material structure.

In order to protect the real minutiae of the extracted user, the present invention uses the chaff minutiae and the polynomial.

To this end, the unique information generating unit 220 generates unique information for generating the polynomial to be used in protecting the minutiae. The unique information may be optionally generated by the registration system and a private key of the user to be used in the encryption system may be used as the unique information.

The polynomial generating unit 230 generates the generated unique information according to a polynomial (f(x)) corresponding to a predetermined degree.

The polynomial projecting unit 240 stores (x, y, θ, type, f(x)) generated by adding results obtained by substituting information of a x coordinate among the minutiae of the user extracted from the real minutiae extracting unit 210 into the polynomial to the first material structure (x, y, θ, type), wherein the (x, y, θ, type, f(x)) is called a third material structure. Alternatively, the polynomial projecting unit 240 stores (x, y, θ, type, f(y)) by adding results obtained by substituting information of a y coordinate among the minutiae of the user extracted from the real minutiae extracting unit 210 into the polynomial to the first material structure (x, y, θ, type).

Also, the chaff minutiae generating unit 250 optionally generates the chaff minutiae from the fingerprint verification system in order to protect the real minutiae information (x, y, θ, type) of the user extracted from the real minutiae extracting unit 210 from the attacker. The chaff minutiae is configured in a form of (x', y', θ', type', β), which is called a second material structure. At this time, unlike the real minutiae information, since β≠f(x'), x' is not a root of the polynomial f(x).

The registration feature generating unit 260 optionally mixes the third material structure with the second material structure and registers it in the storing unit 300.

All the polynomial operations are performed on a finite field $GF(p^2)$ and all the real minutiae are transformed into a form of $GF(p^2)$ and substitutes the transformed value into f(x). In other words, if an element of $GF(p^2)$ is represented by AX+B(A,B∈GF (pP)), x and y may be operated by being changed into A and B, respectively.

The degree of the polynomial generated from the polynomial generating unit 230 of FIG. 2 does not use the fixed value, but is adaptively determined according to the number of minutiae extracted from the real minutiae extracting unit 210. That is, when the number of extracted minutiae is 7, the degree of the polynomial of 6 degree or less should be selected.

At this time, as the number of chaff minutiae added in the chaff minutiae generating unit 250 is increased, the safety is increased since it is difficult to select only the real minutiae (first material structure) even though the fourth material structure stored in the database is leaked. However, since the maximum number of chaff minutiae that can be added according to the size of the fingerprint image is determined, there is a problem in increasing the safety.

Figure 7:
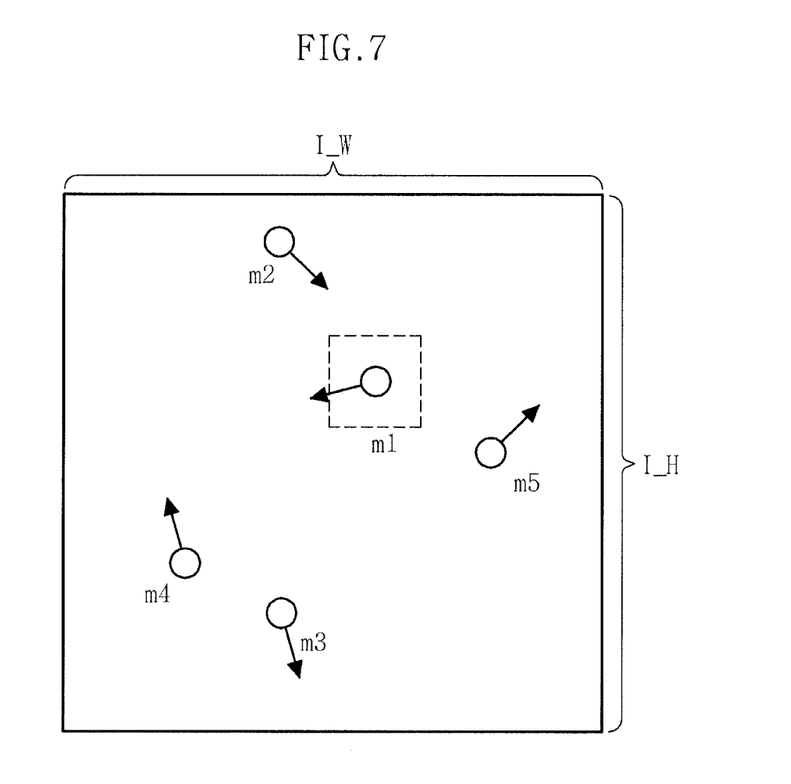
FIGS. 7 to 9 are diagrams for explaining a generation range of the chaff minute generated by the chaff minutiae generating unit of FIG. 2.
Figure 8:
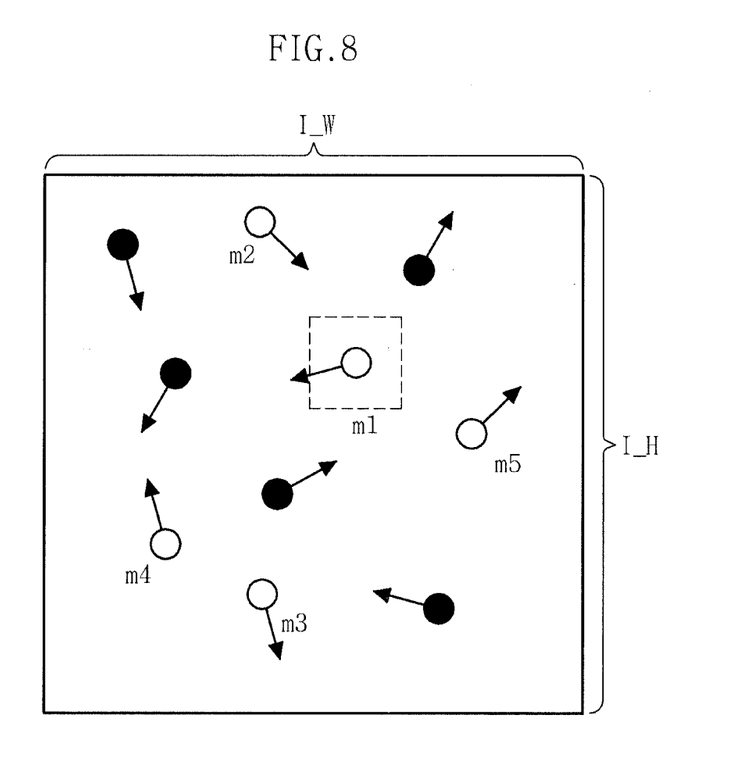
Figure 9:
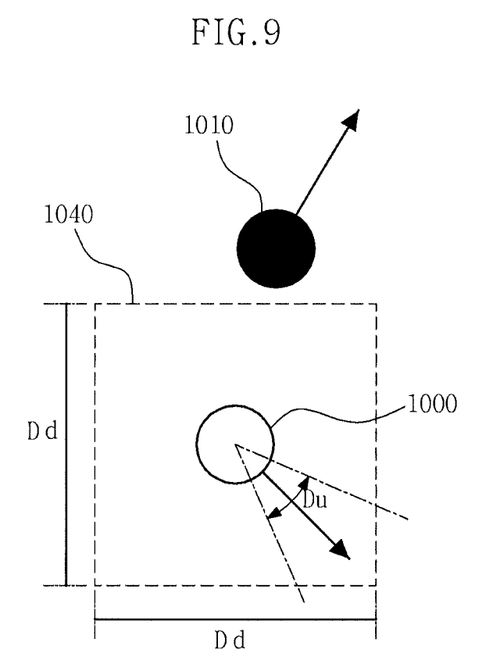

FIGS. 7 to 9 describe the problem related to the number of chaff minutiae.

As described above, the minutiae of the fingerprint is basically configured to have the x and y coordinates of minutiae, the direction of minutiae, and the type of minutiae and is represented by (x, y, θ, type). The real minutiae extracted from the same fingerprint is not extracted at the accurately same position due to the noise of the fingerprint input apparatus, errors generated during the image processing operation, etc., even in the same fingerprint. Therefore, when selecting a pair of coinciding minutiae by comparing the minutiae of the registration fingerprint with the minutiae of the verification fingerprint, tolerance is experimentally defined and it is considered as a pair of coinciding minutiae when two pairs of minutiae is in tolerance. The similarity of two fingerprints is determined using the number of pair of obtained minutiae. When generating the chaff minutiae from the chaff minutiae generating unit 270, there is a problem in that the chaff minutiae can be wrongly determined as the real minutiae if the tolerance is not considered.

Therefore, in the present invention, when the chaff minutiae is generated, it is generated outside the tolerance defined in the fingerprint verification system with respect to the x and y coordinate values and direction, as shown in FIG. 9. In FIG. 9, a white minutiae 1000 is a registered real minutiae and a black minutiae 1010 is a chaff minutiae. In connection with the real minutiae 1000, the minutiae existing in the range meeting tolerance 1030 for tolerance 1020 and direction with respect to the x and y coordinates are considered as the pair of coinciding minutiae. In other words, when being in a quadrangle 1040 represented by a dotted line and meeting the tolerance of the angle, since it is considered as the pair of coinciding minutiae, the chaff minutiae 1010 is generated so that the x and y coordinates and direction have a value outside the tolerance. Meanwhile, the type information of the minutiae configuring the minutiae of the fingerprint is generated as a bifurcation point when the real minutiae 1110 is an ending point and as an ending point when it is a bifurcation point.

FIG. 7 shows the real minutiae (white circle) extracted from the fingerprint image. In FIG. 7, I_W and I_H each represents the length and breadth sizes of the fingerprint image. There are five real minutiae. The quadrangle represented by a dotted line around a first minutiae m1 represents tolerance for x and y in FIG. 9. FIG. 8 shows results obtained by adding the chaff minutiae (black circle) to the fingerprint image of FIG. 7. As shown in FIG. 8, the number of addable chaff minutiae is limited due to the tolerance.

Figure 3:
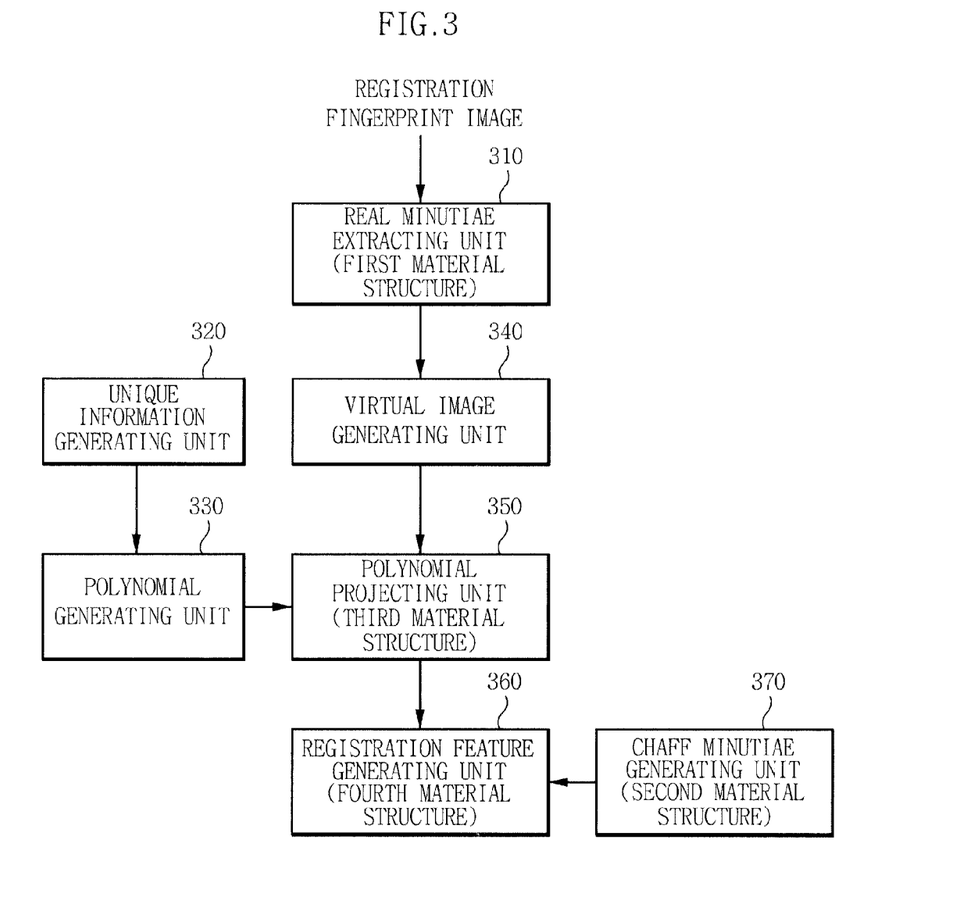
FIG. 3 is a detailed block configuration diagram of another example of the minutiae protecting unit of FIG. 1.

FIG. 3 is a detailed block configuration diagram of another example of the minutiae protecting unit 200 of FIG. 1. The minutiae protecting unit 200 according to the present example further includes a virtual image generating unit 340 that generates the virtual image in order to add the chaff minutiae. Meanwhile, the minutiae protecting unit 200 has the same configuration as FIG. 2 except that a chaff minutiae generating unit 370 further generates the chaff minutiae.

Figure 4:
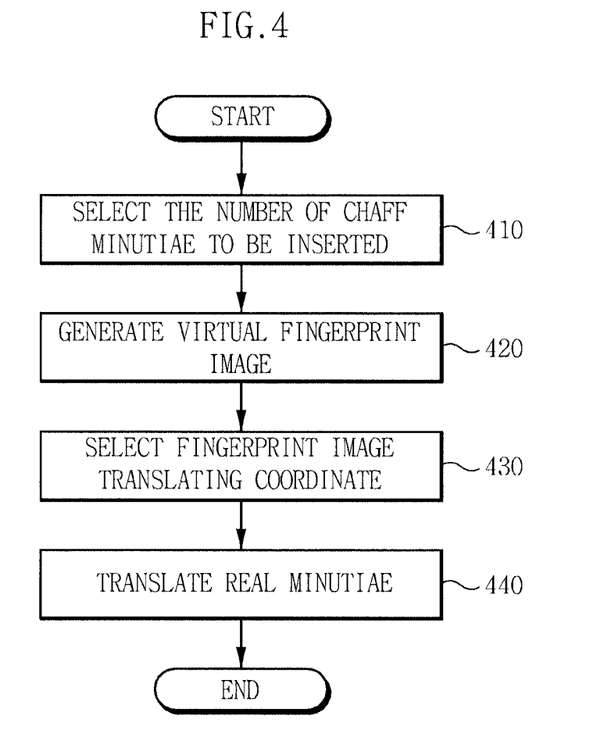
FIG. 4 is a flow chart showing a method of adding a chaff minutiae exceeding a defined number in a fingerprint image using a virtual image according to the present invention.
Figure 10:
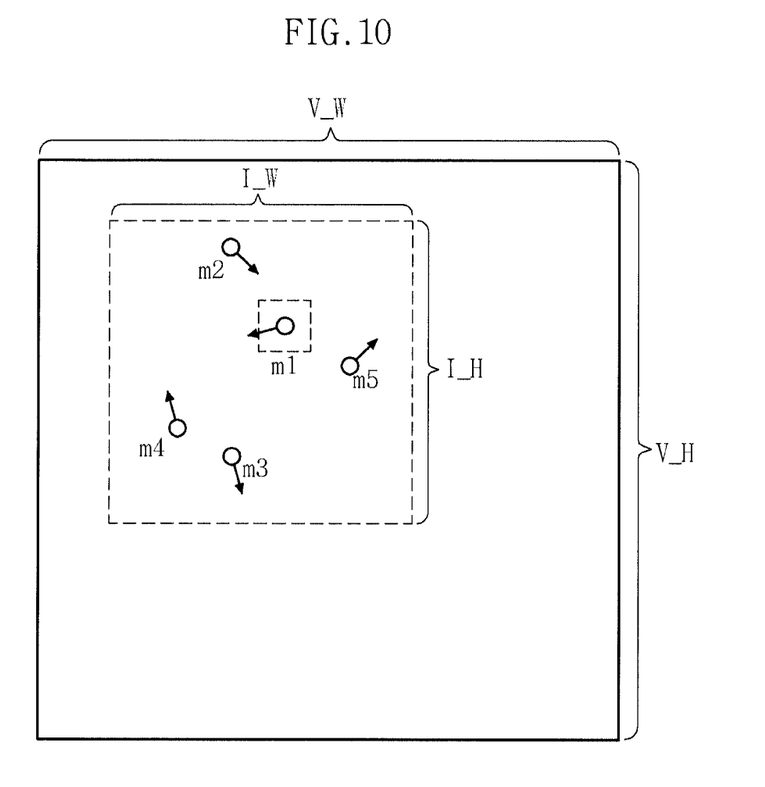
FIGS. 10 and 11 are diagrams for explaining a method of adding the chaff minutiae in the chaff minutiae generating unit in FIG. 4.

FIG. 4 is a flow chart showing a method of adding the chaff minutiae exceeding the defined number in the fingerprint image using the virtual image in the present invention. Further, FIGS. 10 and 11 are diagrams for explaining a method for adding more chaff minutiae.

As shown in FIG. 4, the number of addable chaff minutiae is first determined (410). If the number is determined, a process of generating the virtual fingerprint image that determines the length and breadth of the virtual fingerprint image to which the determined number of chaff minutiae can be added is performed (420). The result obtained by generating the virtual fingerprint image is a quadrangle represented by the outside real line and V_W and V_H each is the length and breadth of the virtual fingerprint image. After the process of generating the virtual fingerprint image (420), a translation coordinate for translating the real fingerprint image to an optional position on the virtual fingerprint image is selected (430). The selected translation coordinate is assumed to be the original point of the real fingerprint image and the real minutiae translates to the virtual fingerprint image (440). FIG. 10 shows a result obtained by translating the real minutiae of FIG. 7 to an optional position on the virtual fingerprint image.

Figure 11:
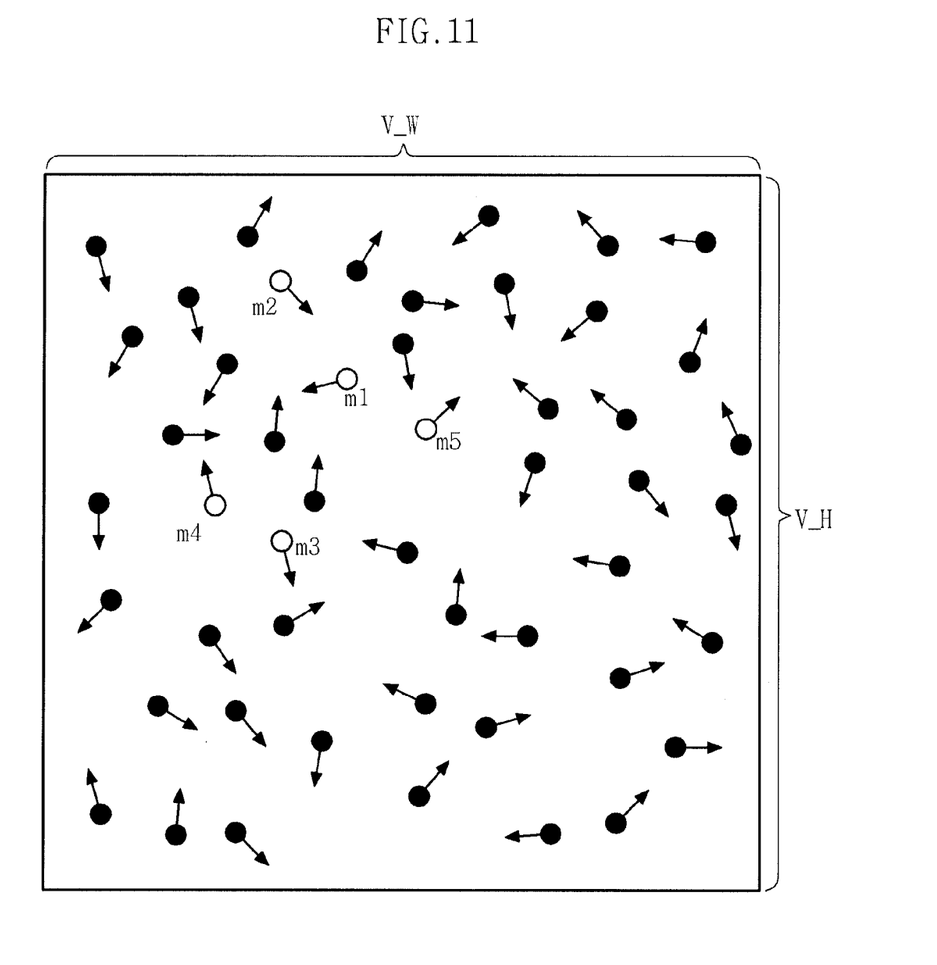

FIG. 11 shows a result obtained by adding the chaff minutiae corresponding to the determined chaff minutiae to the virtual fingerprint image. As shown in FIG. 11, a larger number of chaff minutiae than the added chaff minutiae shown in FIG. 8 can be added.

Figure 5:
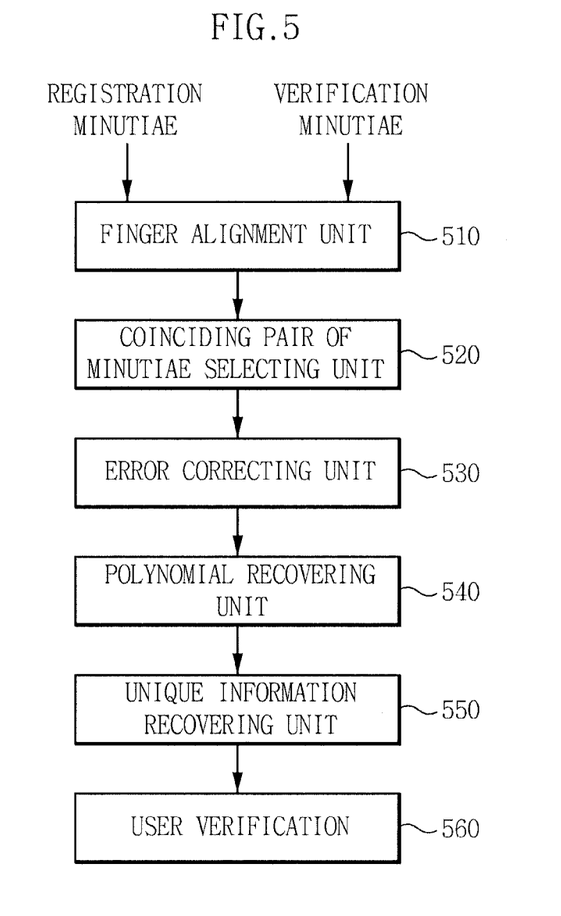
FIG. 5 is a detailed configuration diagram of a fingerprint comparing unit shown in FIG. 1.

FIG. 5 is a detailed configuration diagram of a fingerprint comparing unit shown in FIG. 1. As shown in FIG. 5, a fingerprint comparing unit 500 includes a fingerprint alignment unit 510, a pair of coinciding minute selecting unit 520, an error correcting unit 530, a polynomial recovering unit 540, a unique information recovering unit 550, and a user verifying unit 550.

The fingerprint comparing unit 500 separates the real minutiae from the registration feature (fourth material structure) in which the real minutiae and the chaff minutiae are mixed in order to verify the fact that the user is the person in question by using the fingerprint and then, recovers the same polynomial as one generated from the polynomial generating unit 230 by using the real minutiae and obtains the unique information from the recovered polynomial.

In the verification process as shown in FIG. 1, the fingerprint comparing unit 500 measures the similarity between the verification fingerprint minutiae extracted from the verification fingerprint provided by the user using the verification fingerprint minutiae extracting unit 400 and the registration minutiae registered in the database of the storing unit 300. At this time, the coordinate value of the minutiae is translated each when even the fingerprint of the same person is input to the fingerprint input apparatus and the direction is rotated.

Therefore, the fingerprint alignment unit 510 performs an alignment process of translating and rotating two fingerprints as much as the changed amount.

The coinciding pair of minutiae selecting unit 520 selects the coinciding pair of minutiae among the registration minutiae and the verification fingerprint minutiae aligned in the fingerprint alignment unit 510.

Thereafter, the same polynomial as one generated from the coinciding pair of selected minutiae using the polynomial generating unit 230 should be obtained using the simultaneous equations. However, some of the chaff minutiae my be selected as the coinciding pair of minutiae due to an error when the fingerprint image is obtained through the fingerprint obtaining apparatus even in the fingerprint of the same person and an error when the feature is extracted from the obtained fingerprint image, etc. When the chaff minutiae is selected as the coinciding pair of minutiae, it cannot be recovered using the same polynomial as one generated from the polynomial generating unit 230 using the simultaneous equations. Therefore, the process of correcting the errors is needed and the error correcting unit 530 performs the error correcting process excluding the chaff minutiae from the coinciding pair of minutiae.

The polynomial recovering unit 540 receives the coinciding pair of minutiae configured only of the real minutiae output by performing the error correcting process by the error correcting unit 530 and uses it, thereby recovering the same polynomial as one generated from the polynomial generating unit 230 of FIG. 2. For example, when the polynomial generated from the polynomial generating unit 230 is a 5-degree polynomial, if more than 6 pair of real minutiae is extracted, the same polynomial can be recovered using the simultaneous equations using x and f(x) values in the real minutiae information (x, y, θ, type, f(x)) as an input.

However, when the chaff minutiae is selected as the coinciding pair of minutiae, the same polynomial cannot be recovered by the simultaneous equations since $\beta \neq f(x')$ in the minutiae information (x', y', θ', type', β) as described in the operation of the chaff minutiae generating unit 250. If the error correcting unit 530 uses the method such as a Reed-Solomon decoding algorithm, the result of the error correcting unit 530 may be the recovered polynomial.

The unique information recovering unit 550 obtains the unique information using the coefficient or root of the recovered polynomial.

The user verifying unit 560 is verified as the person in question when the unique information obtained from the unique information recovering unit 550 is the same as the unique information generated from the unique information generating unit 220 of FIG. 2. In particular, the fingerprint alignment unit 510 and the coinciding pair of minutiae selecting unit 520 of FIG. 5 may use the general fingerprint verification algorithm.

According to the present invention, it can add the information of the real minutiae of the user to the information of the chaff minutiae to safely protect the important fingerprint information of the user stored in the storage unit from the external attacker and cannot reuse the information of the fingerprint minutiae since the attacker cannot identify the real minutiae even when the stored information of the fingerprint minutiae is leaked to the outside.

In other words, the present invention can more improve the security than the existing method by generating 1) the virtual fingerprint image and then, adding more chaff minutiae. Further, the present invention can solve the problem of security that is generated when comparing the fingerprint features including the real and chaff minutiae registered twice. In addition, since the fingerprint minutiae are distributed around the middle area of the fingerprint image, there is a problem that the minutiae existing at the edge portion of the fingerprint image can be assumed to be the chaff minutiae when the chaff minutiae are added. However, according to the present invention, 3) since the fingerprint image translates to any positions of the virtual fingerprint image, the minutiae existing at the edge of the virtual fingerprint image cannot be considered as the chaff minutiae, thereby making it possible to improve the security.

While configurations of certain embodiments have been described above with reference to the accompanying drawings, it is by way of example only. Those skilled in the art can make various modifications and changes within the technical spirit of the present invention. Accordingly, the actual technical protection scope of the present invention must be determined by the spirit of the appended claims.

What is claimed is:

1. A fingerprint verification apparatus, comprising;
    a registration fingerprint minutiae extracting unit that extracts real minutiae for a registration fingerprint image subjected to a preprocessing process;
    a minutiae protecting unit that transforms the extracted real minutiae by a polynomial based on unique information, generates a chaff minutiae using a value different from a polynomial result value of the real minutiae in order to hide the extracted real minutiae, generates registration minutiae information using the transformed real minutiae and the chaff minutiae, and stores the generated registration minutiae information in a storage unit;
    a verification fingerprint minutiae extracting unit that extracts the minutiae from an input verification fingerprint image; and
    a fingerprint comparing unit that determines whether the minutiae information extracted from the verification fingerprint minutiae extracting unit coincides with the registration minutiae information stored in the storage unit by measuring the similarity therebetween;
    wherein a degree of the polynomial is adaptively determined according to a number of minutiae extracted from the real minutiae.

2. The fingerprint verification apparatus according to claim 1, wherein the minutiae protecting unit includes:
    a unique information generating unit that generates the unique information for generating a polynomial to be used to protect the extracted real minutiae;
    a polynomial generating unit that generates the generated unique information as the polynomial corresponding to a predetermined degree;
    a polynomial projecting unit that adds results obtained by substituting
    coordinate information among a first data structure that the real minutiae extracted from the registration fingerprint minutiae extracting unit into the polynomial to the first data structure and stores it as a third data structure;
    a chaff minutiae generating unit that generates the chaff minutiae as a second data structure; and
    a registration feature generating unit that mixes the third data structure with the second data structure and registers it in the storing unit.

3. The fingerprint verification apparatus according to claim 2, wherein the first data structure is represented by a type of (x, y, .theta., type) (where x and y are coordinates of minutiae, .theta. is an angle of minutiae, and a type is a type of minutiae), the third data structure is represented by a type of (x, y, .theta., type, f(x), or f(y)) (where f(x) is a result obtained by substituting the information of the x coordinate among the minutiae into the polynomial and f(y) is a result obtained by substituting the information of the x coordinate into the polynomial), and the second data structure is represented by a type of (x',y', .theta.', type', .beta.), .beta..noteq.f(x') or .beta..noteq.f(y'), and x' or y' being not a root of the polynomial f(x) or f(y).

4. The fingerprint verification apparatus according to claim 2, wherein the degree of the polynomial generated from the polynomial generating unit is determined as a smaller degree than the number of minutiae extracted from the registration fingerprint minutiae extracting unit.

5. The fingerprint verification apparatus according to claim 2, wherein the chaff minutiae generating unit generates the chaff minutiae beyond the defined tolerance with respect to the x and y coordinate values and the direction of the real minutiae.

6. The fingerprint verification apparatus according to claim 2, wherein the minutiae protecting unit further includes a virtual image generating unit that generates a virtual fingerprint image, wherein the chaff minutiae generating unit uses the virtual fingerprint image to add a larger chaff minutiae than generated for the fingerprint image.

7. The fingerprint verification apparatus according to claim 2, wherein the fingerprint comparing unit separates the real minutiae from the registration minutiae in which the real minutiae and the chaff minutiae are mixed, uses the separated real minutiae to recover the same polynomial as one generated from the polynomial generating unit, and performs the verification by recovering the unique information from the recovered polynomial.

8. The fingerprint verification apparatus according to claim 1, wherein the fingerprint comparing unit includes:
    a fingerprint alignment unit that performs an alignment process translating and rotating the verification fingerprint minutiae extracted from the verification
    fingerprint minutiae extracting unit and the registration minutiae stored in the storing unit as much as the changed amount;
    a coinciding pair of minutiae selecting unit that selects the coinciding pair of minutiae from the aligned registration minutiae and the verification fingerprint minutiae;

an error correcting unit that performs an error correcting process excluding the chaff minutiae from the coinciding pair of minutiae;

a polynomial recovering unit that receives the pair of minutiae subjected to the error correcting process and recovers the polynomial;

a unique information recovering unit that obtains the unique information using the coefficient or root of the recovered polynomial; and a user verifying unit that verifies as the person in question when the obtained unique information is the same as the unique information generated from the unique information generating unit.

9. A fingerprint verification method, comprising:

forming a first data structure that extracts real minutiae from a registration fingerprint image of input user;

generating a chaff minutiae for hiding the real minutiae;

generating unique information;

generating a polynomial based on the generated unique information;

forming a third data structure by substituting the first data structure into the polynomial;

forming a second data structure by generating a value different from a polynomial result value of the real minutiae with respect to the chaff minutiae; and generating registration minutiae information using the third data structure and the second data structure and registering the generated registration minutiae information wherein a degree of the polynomial is adaptively determined according to a number of minutiae extracted from the real minutiae.

10. The fingerprint verification method according to claim 9, further comprising:

extracting a verification fingerprint minutiae from a verification fingerprint image of the input user;

selecting a coinciding pair of minutiae by comparing the registration minutiae information and the verification fingerprint minutiae information;

recovering a polynomial from the selected pair of minutiae;

recovering unique information from the recovered polynomial; and verifying as the person in question when the recovered unique information is the same as the unique information generated from the unique information generating step.

11. The fingerprint verification method according to claim 9, wherein the first data structure is represented by a type of (x, y, .theta., type) (where x and y are coordinates of minutiae, .theta. is an angle of minutiae, and a type is a type of minutiae), the third data structure is represented by a type of (x, y, .theta., type, f(x) or f(y)) (where f(x) is a result obtained by substituting the information of the x coordinate among the minutiae into the polynomial and f(y) is a result obtained by substituting the information of the x coordinate into the polynomial), and the second data structure is represented by a type of (x',y', .theta.', type', .beta.), .beta..noteq.f(x') or .beta..noteq.f(y') and x' or y' being not a root of the polynomial f(x) or f(y).

12. The fingerprint verification method according to claim 9, wherein the degree of the generated polynomial is determined as a smaller degree than the number of the extracted real minutiae.

13. The fingerprint verification method according to claim 9, wherein the generating the chaff minutiae generates the chaff minutiae beyond the defined tolerance with respect to the x and y coordinate values and the direction of the real minutiae.

14. The fingerprint verification method according to claim 9, further comprising generating a virtual fingerprint image, wherein the generating the chaff minutiae uses the virtual fingerprint image to add a larger chaff minutiae than generated for the fingerprint image.

15. The fingerprint verification method according to claim 14, wherein the adding the chaff minutiae determines the number of chaff minutiae to be added, determines the length and breadth of the virtual fingerprint image to which the chaff minutiae of the determined number is added, selects a translation coordinate for translating a real fingerprint image to an optional position on the virtual fingerprint image, assumes the selected translation coordinate as an original point of the real fingerprint image, and translates the real minutiae to the virtual fingerprint image.

16. The fingerprint verification method according to claim 10, further comprising prior to the selecting the pair of minutiae, translating and rotating the registration minutiae information and the verification fingerprint minutiae information as much as the changed amount and aligning the registration minutiae information and the verification fingerprint minutiae information.

17. The fingerprint verification method according to claim 10, further comprising after selecting the pair of minutiae, performing an error correcting process excluding the chaff minutiae from the coinciding pair of minutiae.

* * * * *